United States Patent
Dauphin et al.

(10) Patent No.: US 10,549,847 B2
(45) Date of Patent: Feb. 4, 2020

(54) AIRCRAFT LANDING GEAR COMPRISING A MAIN DAMPER AND AN ANTI-SHIMMY SECONDARY DAMPER

(71) Applicant: SAFRAN LANDING SYSTEMS, Velizy-Villacoublay (FR)

(72) Inventors: Florent Dauphin, Velizy-Villacoublay (FR); Florent Fortier, Velizy-Villacoublay (FR); Sebastien Dubois, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 441 days.

(21) Appl. No.: 15/421,607

(22) Filed: Feb. 1, 2017

(65) Prior Publication Data

US 2018/0044001 A1    Feb. 15, 2018

(30) Foreign Application Priority Data

Feb. 10, 2016    (FR) ...................................... 16 51081

(51) Int. Cl.
*B64C 25/64* (2006.01)
*B64C 25/50* (2006.01)
*F16F 7/08* (2006.01)

(52) U.S. Cl.
CPC ............ *B64C 25/505* (2013.01); *B64C 25/64* (2013.01); *F16F 7/08* (2013.01)

(58) Field of Classification Search
CPC ....... B64C 25/50; B64C 25/505; B64C 25/34; B64C 25/10

See application file for complete search history.

(56) References Cited

U.S. PATENT DOCUMENTS

| | | | |
|---|---|---|---|
| 2,291,571 A | 7/1942 | Cleveland | |
| 2,399,732 A | 5/1946 | Glover, Jr. | |
| 2,482,961 A | 9/1949 | Bishop | |
| 2,661,915 A | 12/1953 | O'Connor | |
| 5,456,341 A * | 10/1995 | Garnjost | B60G 17/018 188/378 |
| 2009/0078079 A1 | 3/2009 | Manzoor et al. | |
| 2009/0242340 A1* | 10/2009 | Hadley | B64C 25/50 188/267.2 |
| 2018/0111678 A1* | 4/2018 | Dauphin | B64C 25/505 |

* cited by examiner

*Primary Examiner* — J. Woodrow Eldred
(74) *Attorney, Agent, or Firm* — Sughrue Mion, PLLC

(57) ABSTRACT

Aircraft landing gear (1) comprising:
  an axle shaft (2);
  a strut (3) extending along a main strut axis (Z) and having a first part (3a) carrying the said axle shaft (2) and a second part (3b);
  a main damper (5) designed to damp axial movements of the first strut part (3a) with respect to the second strut part (3b);
  a first secondary damper (6a) distinct from the said main damper and designed to damp a movement of angular oscillation, about the axis (Z).
The first secondary damper (6a) is carried by the first strut part (3a) and comprises:
  an inertial mass (M); and
  means (7a) of connecting the inertial mass (M) to the first strut part (3a) which means are designed to damp rotational movements of this inertial mass (M) about the axis (Z).

10 Claims, 4 Drawing Sheets

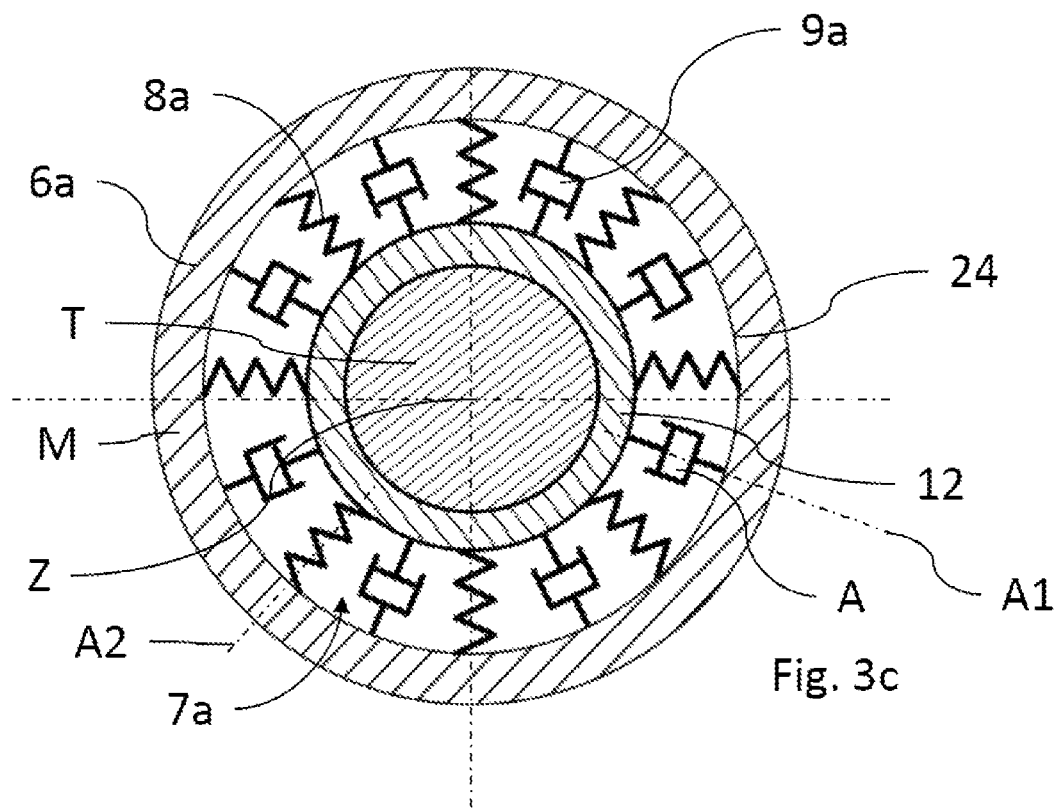
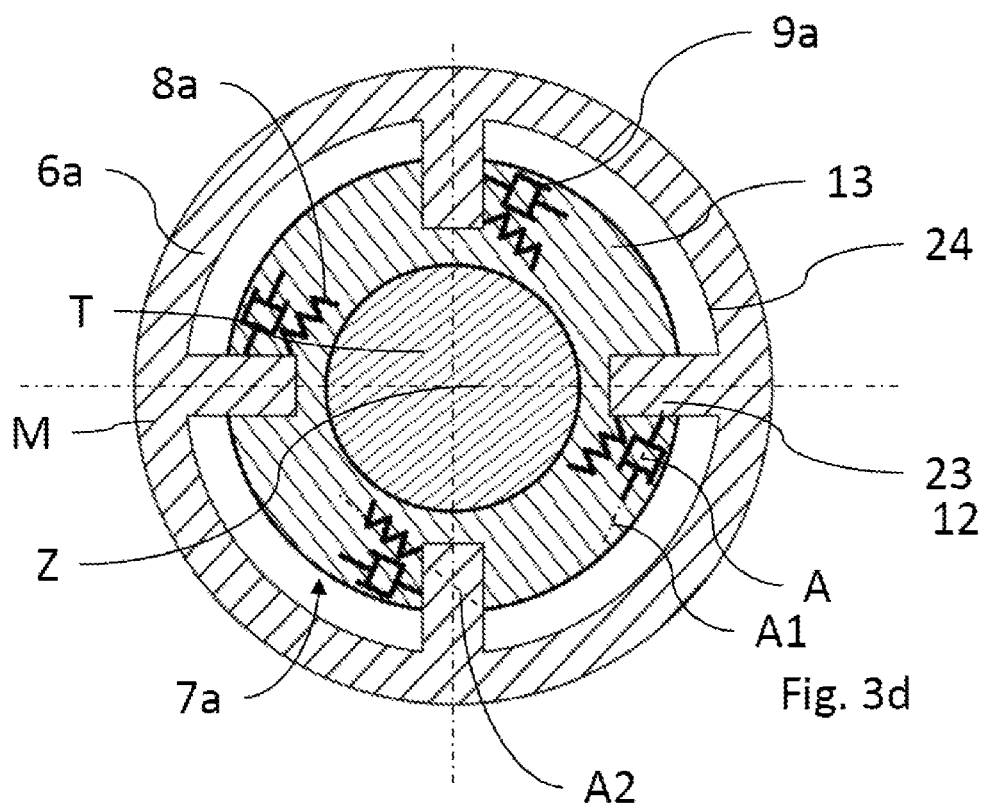

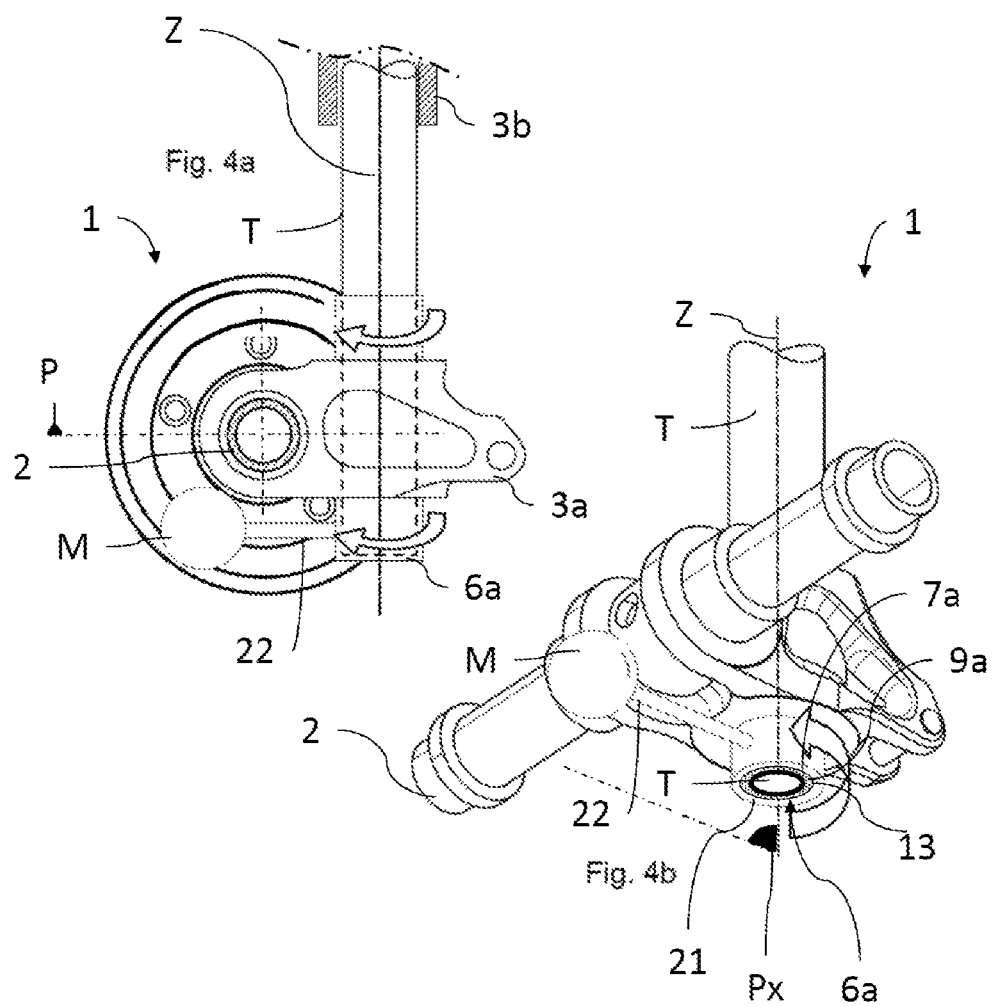

AIRCRAFT LANDING GEAR COMPRISING A MAIN DAMPER AND AN ANTI-SHIMMY SECONDARY DAMPER

The present invention relates to a landing gear for an aircraft comprising a main damper and a secondary damper.

BACKGROUND OF THE INVENTION

Patent document WO200058642 for example discloses an aircraft landing gear comprising:
- an axle shaft designed to carry at least one wheel via which the aircraft runs along the ground;
- a strut extending along a main strut axis and having a first part carrying the said axle shaft and a second part designed to be connected to a bearing structure belonging to the aircraft, the said main strut axis passing through these first and second strut parts;
- a main damper designed to damp axial movements of the first strut part with respect to the second strut part;
- a first secondary damper distinct from the said main damper and designed to damp a movement of angular oscillation, about the main strut axis, of the first strut part with respect to the second strut part.

The bearing structure of the aircraft is the aircraft structure to which the landing gear is attached for transferring load between the landing gear and the rest of the aircraft.

When the landing gear is running, vibratory/oscillatory phenomena referred to as shimmy may appear between the first and second strut parts. This phenomenon of shimmy includes at least one rotational oscillation, about the main axis of the landing gear, of the first landing gear part with respect to the second landing gear part. This rotational oscillation is generated by torsion of the strut about its main axis. Other vibratory/oscillatory phenomena may be added to this rotational oscillation. In particular, the shimmy phenomenon frequently combines oscillations of the strut in longitudinal bending with oscillations in rotation about the main strut axis.

These vibratory phenomena create discomfort and it is desirable to eliminate them.

These vibratory/oscillatory phenomena are dependent on several factors such as the load on the landing gear, its shape, its design, its flexibility and the running speed.

In order to lessen this phenomenon, patent document WO200058642 suggests fitting a specific damper, referred to as an anti-shimmy damper or, hereinafter, a secondary damper. In that patent document, the secondary damper couples the second strut part which is connected to the structure of the aircraft to the first part of the landing gear strut that carries the axle shaft. This mechanical coupling of the first and second strut parts via the secondary damper (the anti-shimmy damper) makes it possible to damp angular oscillations, about the main strut axis, of the first strut part with respect to the second strut part.

Incorporating this type of anti-shimmy damper into the geometry of the landing gear is problematic because this secondary damper needs to perform its damping function while at the same time allowing the landing gear to pass from a gear-down configuration outside the bay to a gear-up configuration in which the landing gear is retracted inside the bay.

OBJECT OF THE INVENTION

One object of the present invention is to provide a landing gear that is an alternative to the one described in patent document WO200058642, this landing gear according to the invention comprising at least one first secondary damper designed to damp the angular oscillatory movements of the first strut part with respect to the second strut part.

SUMMARY OF THE INVENTION

With a view to achieving this object, the invention proposes an aircraft landing gear comprising:
- an axle shaft designed to carry at least one wheel via which the aircraft runs along the ground;
- a strut extending along a main strut axis and having a first part carrying the said axle shaft and a second part designed to be connected to a bearing structure belonging to the aircraft;
- a main damper designed to damp axial movements of the first strut part with respect to the second strut part;
- at least one first secondary damper distinct from the said main damper and designed to damp a movement of angular oscillation, about the main strut axis, of the first strut part with respect to the second strut part.

This landing gear according to the invention is essentially characterized in that the said first secondary damper is carried by the first strut part, this first secondary damper comprising:
- an inertial mass; and
- connecting means connecting this inertial mass to the first strut part, these connecting means being designed to damp at least rotational movements of this inertial mass with respect to the first strut part and about the main strut axis.

By virtue of the invention, the first secondary damper is fixed to the first strut part only via its means of connection which are attached to this first strut part. Thus, the first secondary damper is wholly carried by the first landing gear part alone. This first secondary damper is close to the regions of the strut which see the greatest angular amplitudes of oscillation between the first and second strut parts, namely on the component to which the axle shaft is fixed.

The damping of the shimmy is thereby improved since it is performed near the source of the oscillation, namely near the wheels which transmit load and vibration during running.

Moreover, the fact that the secondary damper is carried only by the first strut part makes it easier to incorporate into the landing gear since none of the landing gear components, with the possible exception of this first part, needs to be modified in order to incorporate the shimmy damping function.

According to one particular embodiment of the invention, the landing gear further comprises a first rim for supporting a first wheel on which the aircraft runs and a second rim for supporting a second wheel on which the aircraft runs. These first and second rims are mounted for rotation about the axle shaft and the first secondary damper is mounted between the first and second rims.

The positioning of the secondary damper, between the rims, means it can be brought closer to the axle shaft carrying the rims, the anti-shimmy damping effect being thereby improved.

In order to increase the effectiveness of the secondary damper while at the same time limiting the bulk associated with the shimmy damping function, steps can be taken to ensure that the first secondary damper is at least partially arranged inside a hollow zone of the first rim and inside a hollow zone of the second rim.

The inertial mass of the first secondary damper may also be in the shape of a ring which extends around the first strut part. Such a ring allows the mass to be centred about the main strut axis thereby improving the damping of oscillations that combine torsion and bending of the strut.

In this embodiment, the connecting means may also be designed to allow the ring-shaped mass to move not only in an oscillatory rotational movement of the mass about the first strut part, but also in an oscillatory translational movement of the mass along the main strut axis. Thus, the first secondary damper may have a damping effect on strut movements parallel to the main strut axis.

As an alternative to the foregoing embodiment, the connecting means which connect the inertial mass of the first secondary damper to the first strut part comprise an arm extending radially with respect to the said main strut axis and carrying this inertial mass at one of its ends.

Ideally, the first landing gear part is a sliding tube extending along the main strut axis, the axle shaft extending in a plane perpendicular to the main strut axis. The connecting means of the first secondary damper have a first fixing ring encircling the tube. This way of fixing the secondary damper to the tube allows a shimmy damping function to be provided without the need to modify the component parts of this landing gear strut.

BRIEF DESCRIPTION OF THE DRAWINGS

The invention will be better understood in the light of the following description of particular nonlimiting embodiments of the invention, with reference to the figures of the attached drawings in which:

FIGS. 3a, 3b, 3c, 3d illustrate views in cross section of several secondary dampers mounted on a landing gear tube and the inertial masses of which are in the shape of rings extending around the landing gear tube; these FIGS. 3a, 3b, 3c, 3d illustrate various ways of embodying means of connection between an annular inertial mass and the first strut part, in this instance the main tube of the landing gear;

FIG. 4a illustrates a view in cross section of a landing gear according to the invention in a plane of section transverse to the axle shaft, the inertial mass here being mounted at one end of an arm that oscillates about the main axis of the landing gear strut;

FIG. 4b is a perspective view from beneath of the landing gear illustrated in FIG. 4a.

DETAILED DESCRIPTION OF THE INVENTION

Figure 1:
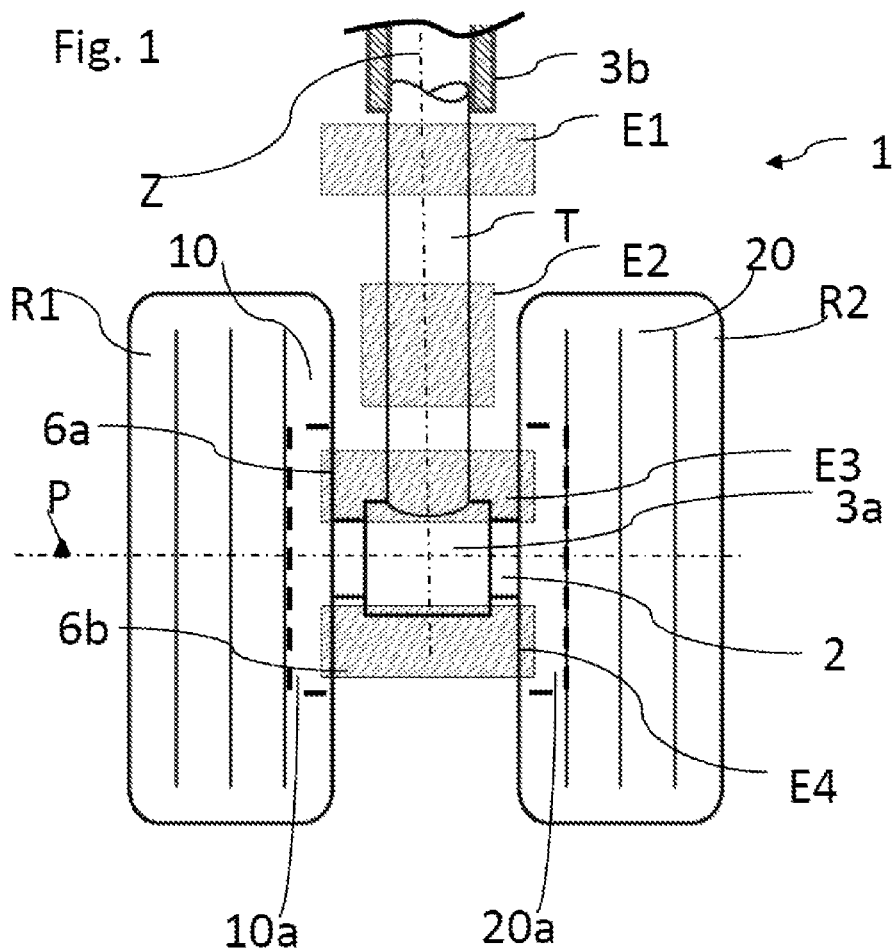
FIG. 1 shows a landing gear according to the invention, several hatched regions illustrating possible locations at which one or more secondary dampers/anti-shimmy dampers can be fixed against and along the landing gear tube.

As indicated previously, the invention essentially relates to a landing gear 1 for an aircraft, comprising an axle shaft 2 designed to carry at least one, and in this instance two, wheels R1, R2 on which the aircraft runs along the ground.

The landing gear 1 comprises a strut 3 extending along a main strut axis Z and having a first part 3a carrying the said axle shaft 2 and a second part 3b designed to be connected to a bearing structure belonging to the aircraft. The axle shaft extends in a plane perpendicular to the main axis Z of the strut. These first and second strut parts 3a, 3b are mounted with the ability to slide relative to one another along the said main strut axis Z which passes through these parts 3a, 3b.

A main damper 5 is designed to damp axial movements, along the main strut axis Z, of the first strut part 3a with respect to the second strut part 3b.

Although this has not been depicted in the figures, it is possible for the landing gear according to the invention to comprise an orientation mechanism designed to orient the first part of the strut 3a with respect to the second part of the strut 3b by rotating the first strut part about an orientation axis extending along the strut and preferably coinciding with the main axis Z.

The landing gear according to the invention also comprises a first secondary damper 6a distinct from the said main damper and designed to damp a movement of angular oscillation, about the main strut axis Z, of the first strut part 3a with respect to the second strut part 3b.

In all the embodiments of the invention, this first secondary damper 6a is of the type comprising:
at least one inertial mass M; and
connecting means 7a connecting this inertial mass M to the first strut part 3a, these connecting means 7a being designed to damp at least rotational movements of this inertial mass M with respect to the first strut part 3a and about the main strut axis Z.

Thus, this first secondary damper 6a is carried by the first strut part 3a and its inertial mass M extends on the outside of this first strut part so that it can oscillate about the main axis Z of the strut.

The shimmy movement is associated with a torsion of the strut and bending of the strut along its main axis Z. Torsion involves a rotation of the first strut part with respect to the second strut part, this rotation driving the first secondary damper in rotation about the main axis Z.

When the first strut part 3a is set in motion in a plane perpendicular to the main axis Z (by rotation of the strut about the axis Z and/or translational movement of the first part in a plane perpendicular to the axis Z) it then transmits energy to the inertial mass M of the secondary damper via the connecting means 7a. In return, the inertial mass M, via these same connecting means 7a, applies an opposing force to the first strut part 3a (bottom strut assembly). The strut oscillations are thus damped by dissipation of energy at the connecting means 7a.

The mass M and the connecting means 7a are preferably defined in such a way as to target the damping of a given natural frequency of the landing gear.

By virtue of the invention, the shimmy is at least partially damped because the secondary damper or dampers 6a, 6b which are assembled on the first strut part 3a, some distance from the first part 3b, absorb energy to set in motion the mass M and also to damp the oscillations of this mass M with respect to the first tube part.

As illustrated in FIGS. 1, 3a, 3b, 3c, 3d, 4a, 4b, the first strut part 3a comprises a tube T, referred to as main tube, which extends along the main axis Z, the axle shaft 2 extending from this tube T and in a plane P perpendicular to the main axis Z. The second strut part generally comprises a barrel to accommodate part of the tube T in sliding.

The hatched zones illustrated in FIG. 1 illustrate various locations E1, E2, E3, E4 for the first strut part which may carry a first secondary damper 6a and possibly a second secondary damper 6b, in the event that the first part carries several secondary dampers of the predefined type.

The first location E1 is situated on the tube T, above the wheels R1, R2 which are respectively carried by the axle 2 via the rims 10, 20. This location E1 is advantageous because it makes it possible to have an inertial mass M extending a large distance away from the main axis Z without being restricted by the minimum distance extending from one wheel to the tube T.

A second possible location E2 is situated between the wheels R1, R2, on a portion of the tube T facing an upper part of the wheels R1, R2. This location E2 is advantageous because it allows a damping of shimmy without increasing the bulk of the landing gear. Moreover, the secondary damper 6a is away from the brake zone (heat sink) and thus better preserved.

A third possible location E3 is situated between the wheels R1, R2, on the tube T, in the immediate vicinity of the axle 2. This location E3 extends into respective hollow zones 10a, 20a of the rims 10, 20 which carry the wheels R1, R2. This embodiment is advantageous because, on the one hand, the inertial mass M can be situated a long distance away from the axis Z, making it possible:
- to increase the lever arm about the axis Z needed for damping; and
- to position the secondary damper in very close proximity to the axle shaft 2 (where the angular amplitudes of movements that are to be damped are at their maximum).

A fourth possible location E4 is situated between the wheels R1, R2 (between the rims 10, 20), on the rod T, in the immediate vicinity of the axle 2 and below the latter. This location E4 may, if necessary, extend into respective hollow zones 10a, 20a of the rims 10, 20. This embodiment is advantageous because, like with the location E3, it is possible to increase the damping lever arm while at the same time being close to the axle shaft 2. The landing gear of FIG. 4a comprises an example of a secondary damper placed at location E4.

In the embodiments illustrated in FIGS. 3a, 3b, 3c, 3d and 4a, 4b, the connecting means 7a connecting the said inertial mass M to the first strut part 3a comprise:
- elastic return means 8a returning the inertial mass M towards a fixed rest position of the inertial mass M with respect to the axle shaft 2; and
- damping means 9a which have a damping coefficient of predetermined value.

These elastic return means 8a have a value of angular stiffness of the inertial mass M in rotation about the main strut axis Z and with respect to the first strut part 3a which is constant.

The damping coefficient is a coefficient of damping of the rotational movements of mass M about the main strut axis Z and with respect to the first strut part 3a.

Predetermining the stiffness coefficient and the coefficient of damping of the movements about the axis Z makes it possible to define how the landing gear according to the invention damps shimmy movements.

Figure 2:
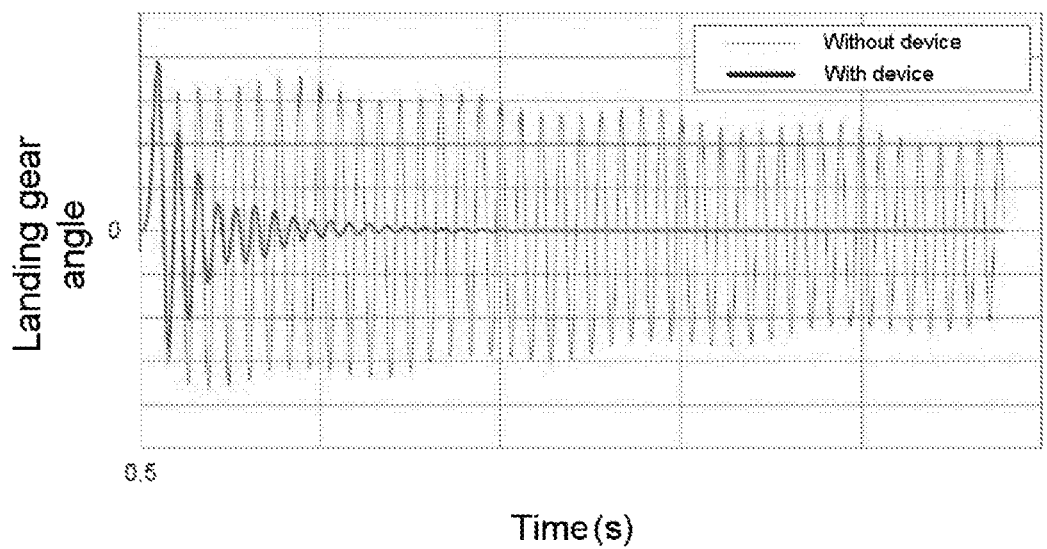
FIG. 2 illustrates curves with respect to time of the damping of angular oscillations on a landing gear not equipped with a secondary damper (first angular oscillation curve in fine line) and on a landing gear according to the invention equipped with a secondary damper for damping angular oscillations (second angular oscillation curve in thick line)

FIG. 2 illustrates the damping of an angular movement about the axis Z, with respect to time. The curve in fine line corresponds to a landing gear that does not have a secondary damper. The curve in bold line corresponds to landing gear equipped with a secondary damper according to the invention. It may be seen that the landing gear according to the invention allows a sharp attenuation of the angular oscillations with respect to the landing gear without a secondary damper.

Figure 3A:
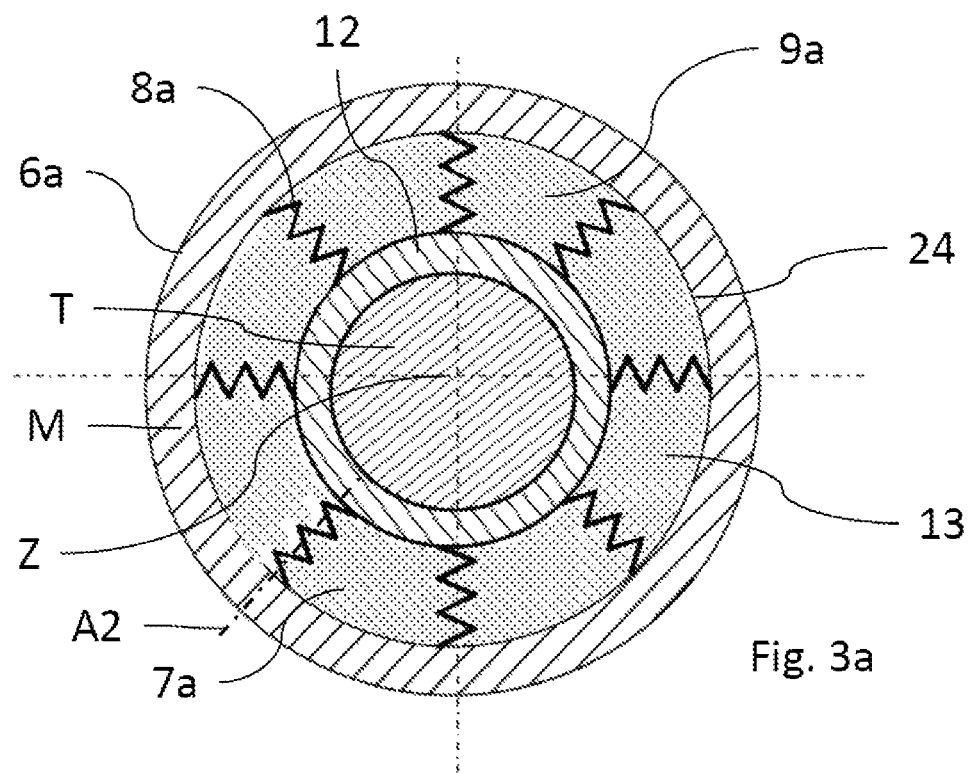

As illustrated in FIGS. 3a, 3c, the connecting means 7a which connect the inertial mass M of the first secondary damper 6a to the first strut part 3a may comprise a first fixing ring 12 secured to and around the said first strut part (in this instance the tube T). This first fixing ring 12 allows the secondary damper 6a to be centred and fixed by encircling about a cylindrical portion of the first strut part.

Alternatively, the damping means may have the form of an elastomer sleeve 13 fitted directly around the tube T and in this case this elastomer sleeve 13 also acts as a fixing ring as in FIGS. 3b, 3d, 4a, 4b.

Figure 3B:
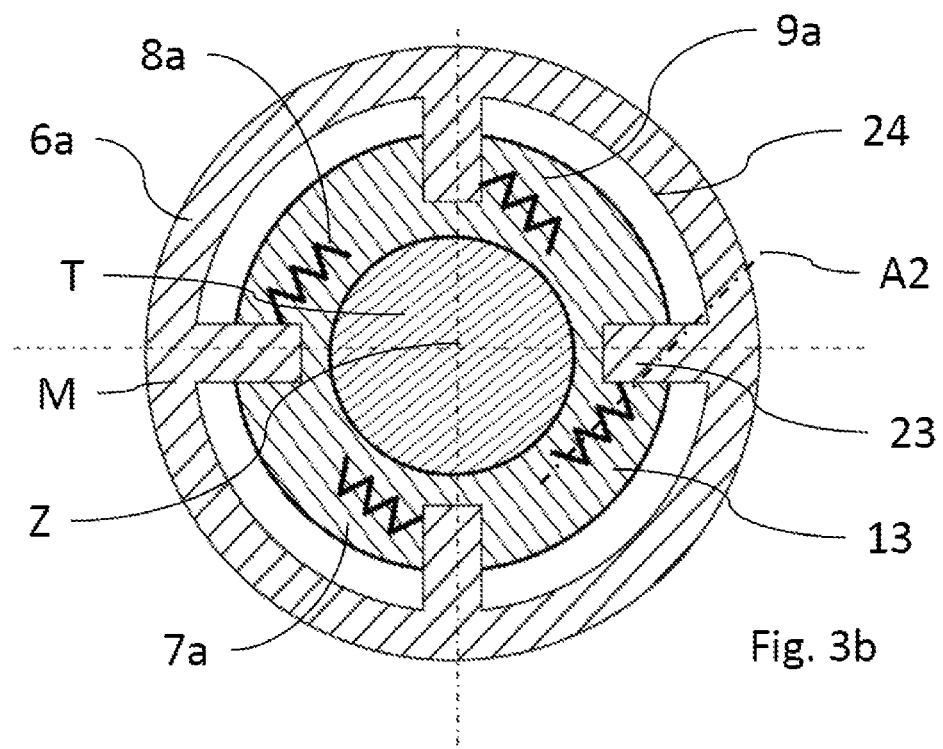

It should be noted that this elastomer sleeve 13 may also extend in contact with a cylindrical internal face of the annular mass M, as in FIG. 3a or may be distanced away from this internal face of the mass M, as in FIGS. 3b and 3d.

The mechanical connection between this elastomer sleeve 13 and the mass M may be achieved via internal protrusions 23 of the mass M extending from a cylindrical internal face 24 of the mass M towards the axis Z and penetrating the sleeve from the outside of this elastomer sleeve E. These protrusions 23 allow a rotational coupling between the sleeve 13 and the mass M while at the same time leaving a space between the mass M and the sleeve 13 between the protrusions 23. This limits wear of the sleeve through contact with the mass M and through shear at the site of this contact.

In the embodiment of FIGS. 4a, 4b, the inertial mass M may be carried at the end of the arm 22.

In this embodiment, the first secondary damper 6a comprises a retaining ring 21 for the arm 22 which extends all around the main strut axis Z. This arm 22 is secured at one of its ends to the retaining ring 21 while the other of its ends carries the mass M. This mass M is spherical in this instance but could have any other compact shape. As illustrated in these FIGS. 4a, 4b, the connection between this retaining ring 21 and the fixing ring 12 may be via the elastic return means 8a and the damping means 9a.

Because of this arrangement of the fixing ring 12, of the retaining ring 21 and of the elastic return means 8a, when the retaining ring 21 is pivoted with respect to the main strut axis Z, the elastic return means 8a then exert an elastic return torque tending to return the retaining ring 21 towards a fixed rest position with respect to the first strut part 3a. In this fixed rest position, the arm 22 is preferably in a plane of symmetry Px of the strut in which the main strut axis Z also extends. The mass M is then equidistant between the rims 10, 20.

Several possible arrangements of the elastic return means 8a and damping means 9a that allow the tube T to be connected to an annular ring of the tube and held a distance away therefrom will now be illustrated with reference to FIGS. 3a, 3b, 3c, 3d. This annular ring of the tube is, in this instance, an annular mass M, but could also be a retaining ring 21 of mass M, in the aforementioned instance in which the mass M is carried by an arm 22 extending radially from the retaining ring 21.

In each of the FIGS. 3a, 3b, 3c, 3d, the mass M of the secondary damper 6a is annular and extends all around a longitudinal part of the tube T.

The elastic means 8a comprise springs distributed between the tube T and the annular mass M. These springs 8a keep the tube T and the annular mass M apart from one another so as to allow a radial translational oscillation with respect to the axis Z and/or a rotational oscillation with respect to this axis Z.

These springs 8a may be arranged in such a way that their axes of elastic compression or tension A2 are radial with respect to the tube T (which means to say with respect to the axis Z), as in FIGS. 3a and 3c. With this arrangement, the springs are effective at damping oscillations of the mass M in radial translation with respect to the tube T and also angular rotational oscillations of the mass M about the axis Z.

As illustrated in FIGS. 3b and 3d, at least some of the springs 8a are arranged in such a way that the spring compression or tension axis A2 is perpendicular give or take 45° to a plane radial to the axis Z corresponding to it. This makes it possible to have an improved capability to damp radial oscillations of the mass M about the axis Z.

However the springs 8a are positioned, they can be placed in an elastomer, which may have the form of an elastomer sleeve 13. The elastomer of which the sleeve 13 is made has the capability to damp deformations of the springs incorporated into it (see FIGS. 3b and 3d).

As illustrated in FIGS. 3c and 3d, it is also possible for fluid dampers A to be used to transmit load between the tube T and the mass M. Each fluid damper A has a preferred damping axis A1 and a fluid compression chamber the volume of which varies according to the relative movements between the mass M and the tube T.

In the case of at least some of these fluid dampers A, it is possible to have a preferred damping axis A1 oriented:
  radially with respect to the axis Z, as in FIG. 3c (which allows improved damping of radial oscillations); or
  perpendicularly, give or take 45°, with respect to a plane radial to the axis Z, as in FIG. 3d (which allows improved damping of angular oscillations).

As discussed hereinabove and illustrated in FIGS. 3a, 3b, 3c, 3d and 4a, 4b, a first fixing ring 12 may be used to secure the secondary damper 6a to and around the tube T. This ring 12 which encircles a cylindrical portion of the tube T may comprise means of adjustment of its inside diameter in order to adjust how tightly it encircles the tube T.

The springs 8a and fluid dampers A may, if necessary, be connected directly to this fixing ring 12.

It should be noted that, as illustrated in the embodiment of FIGS. 4a and 4b, a simple elastic annular sleeve 13 concentric with the main strut axis Z may extend all around the first fixing ring 12 and by itself form the elastic means 8a and the damping means 9a.

This elastic sleeve 13 may be formed from a material having a predetermined elastic stiffness and a predetermined damping coefficient. Thus, this sleeve 13 performs both an elastic return function and a damping function. As described previously, return springs or fluid dampers may be incorporated into this elastic sleeve 13 to improve the elastic return and/or damping function.

The invention is not concerned solely with that which has just been described and in particular may also cover an embodiment that has not been depicted and in which the first strut part 3a carries a second secondary damper 6b distinct from the said first secondary damper 6a. This second secondary damper 6b comprises:
  a second inertial mass; and
  second connecting means connecting this second inertial mass to the said first strut part 3a, these second connecting means being designed to damp rotational movements of this second inertial mass M about the strut axis Z and with respect to the said first strut part 3a.

The second inertial mass of the second secondary damper 6b may be in the form of a ring 14 extending around the said first strut part 3a.

In other words, if necessary, the tube T may carry several secondary dampers of the type of the said first secondary damper.

Each secondary damper 6a, 6b may be designed to damp a given range of oscillatory frequencies that corresponds to it. These ranges of oscillatory frequencies which correspond to the various secondary dampers may be identical to one another or distinct from one another.

To this end, the mass and/or the stiffness coefficient and/or the damping coefficient of the connecting means 7a of each secondary damper 6a, 6b may differ from the mass, stiffness coefficient and damping coefficient of the other secondary damper or dampers.

This allows each secondary damper to be adapted so that it provides a particular type of damping specific to it, these secondary dampers thus complementing one another.

Thus, if the landing gear has several ranges of natural frequencies of vibration, each secondary damper will be able to be adapted so that it allows damping of just one of these frequency ranges, and there will be as many types of secondary damper as there are frequency ranges to damp.

The invention claimed is:

1. An aircraft landing gear (1) comprising:
  an axle shaft (2) designed to carry at least one wheel via which the aircraft runs along the ground;
  a strut (3) extending along a main strut axis (Z) and having a first part (3a) carrying the said axle shaft (2) and a second part (3b) designed to be connected to a bearing structure belonging to the aircraft, the said main strut axis (Z) passing through these first and second strut parts (3a, 3b);
  a main damper (5) designed to damp axial movements of the first strut part (3a) with respect to the second strut part (3b);
  a first secondary damper (6a) distinct from the said main damper and designed to damp a movement of angular oscillation, about the main strut axis (Z), of the first strut part (3a) with respect to the second strut part (3b), characterized in that the said first secondary damper (6a) is wholly carried by the first strut part (3a) alone, this first secondary damper (6a) comprising:
  an inertial mass (M); and
  connecting means (7a) connecting this inertial mass (M) to the first strut part (3a), these connecting means (7a) being designed to damp at least rotational movements of this inertial mass (M) with respect to the first strut part (3a) and about the main strut axis (Z).

2. The aircraft landing gear according to claim 1, further comprising a first rim (10) for supporting a first wheel on which the aircraft runs and a second rim for supporting a second wheel on which the aircraft runs, these first and second rims being mounted for rotation about the axle shaft (2), the first secondary damper (6a) being mounted between the first and second rims (10, 20).

3. The aircraft landing gear according to claim 2, in which the first secondary damper (6a) is at least partially arranged inside a hollow zone (10a) of the first rim (10) and inside a hollow zone (20a) of the second rim (20).

4. The aircraft landing gear according to claim 1, in which the inertial mass of the first secondary damper (6a) is in the shape of a ring (14) and extends around the said first strut part (3a).

5. The aircraft landing gear according to claim 1, in which the connecting means (7a) which connect the inertial mass (M) of the first secondary damper (6a) to the first strut part (3a) comprise an arm (22) extending radially with respect to the said main strut axis (Z) and carrying this inertial mass (M) at one of its ends.

6. The aircraft landing gear according to claim 1, in which the said connecting means (7a) designed to connect the said inertial mass (M) of the said first secondary damper (6a) to the said first strut part comprise a first fixing ring (12) secured to and around the said first strut part and an elastic annular sleeve (13) concentric with the said main strut axis (Z), this elastic annular sleeve extending all around the first fixing ring (12).

7. The aircraft landing gear according to claim 1, in which the said connecting means (7a) connecting the said inertial mass (M) to the first strut part (3a) comprise:
  elastic return means (8a) returning the inertial mass (M) towards a fixed rest position of the inertial mass with respect to the axle shaft (2); and
  damping means (9a) which have a damping coefficient of predetermined value.

8. The aircraft landing gear according to claim 7, in which the said elastic return means (8a) have a value of angular stiffness of the inertial mass (M) in rotation about the main strut axis (Z) and with respect to the first strut part (3a) which is constant.

9. The aircraft landing gear according to claim 1, in which the said first strut part (3a) carries a second secondary damper (6b) distinct from the said first secondary damper (6a), this second secondary damper (6b) comprising:
  a second inertial mass; and
  second connecting means connecting this second inertial mass to the said first strut part (3a), these second connecting means being designed to damp rotational movements of this second inertial mass (M) about the strut axis (Z) and with respect to the said first strut part (3a).

10. The aircraft landing gear according to claim 9, in which the second inertial mass of the second secondary damper (6b) is in the shape of a ring (14) and extends around the said first strut part (3a).

\* \* \* \* \*